United States Patent [19]

Kalenian

[11] Patent Number: 5,078,122
[45] Date of Patent: Jan. 7, 1992

[54] HOOD FOR A COUNTER TOP STOVE

[76] Inventor: Paul A. Kalenian, 104 Meriam Rd., Princeton, Mass. 01541

[21] Appl. No.: 647,155

[22] Filed: Jan. 29, 1991

[51] Int. Cl.⁵ .............................................. F24C 15/20
[52] U.S. Cl. .............................. 126/299 R; 126/299 C
[58] Field of Search ........... 126/299 C, 299 D, 299 F, 126/300–303, 21 R, 282, 283, 214 D, 215; 220/367–370

[56] References Cited

U.S. PATENT DOCUMENTS

| | | | |
|---|---|---|---|
| 2,417,124 | 3/1947 | Ramsey | 126/382 |
| 2,551,026 | 5/1951 | Loeher, Jr., et al. | 126/299 C |
| 2,591,786 | 4/1952 | Cronheim | 126/299 C |
| 2,623,516 | 12/1952 | Salem | 126/299 C |
| 3,082,566 | 3/1963 | Morand et al. | 220/369 |
| 3,814,078 | 6/1974 | Etzcorn | 126/299 C |

Primary Examiner—James C. Yeung
Attorney, Agent, or Firm—Shlesinger Arkwright & Garvey

[57] ABSTRACT

This disclosure is concerned with a removable hood for use over the grill or broiler section of a counter top stove such as a Jen-Air ™ stove having a suction exhaust inlet centered between the burners in the counter top.

2 Claims, 1 Drawing Sheet

HOOD FOR A COUNTER TOP STOVE

This invention relates to a hood means for controlling the emission of spatter, fumes and cooking gasses from a stove and more particularly this invention provides a removable hood for use with counter top stoves that is adapted to collect the spatter and control the flow of cooking fumes and gasses arising from the burners, the hood being operative to direct the flow of such fumes and gasses from over the burners of the stove to flow to the inlet of the exhaust means in such stoves that have down-draft counter top suction inlet means adjacent the burners. This hood is also designed to reflect back onto the food being cooked, any heat rays radiating upwardly from the food and burners into the space above the cooking zone.

BACKGROUND

In recent times, a form of a stove primarily designed for domestic use has become popular wherein electrical resistor or gas burner units are mounted in a counter top in the kitchen area of a home or possibly in some commercial installations, which stove has an inlet to a suction means positioned centrally within the burner array and wherein the suction means is designed to remove all of the hot air, steam, grease vapors and other particles and gasses arising from the normal cooking activities. The collected gasses and particles are then conveyed by a suitable duct system to be discharged to the atmosphere. One such popular cooking means is sold under the "Jen-Air" trademark.

For most cooking procedures the arrangement is quite satisfactory, but it has been found, however, when a steak for example is being broiled on such a stove, that while some of the smoke, particles and other fumes are mostly removed from the cooking area, there is a visible as well as an invisible gaseous flow of vaporized grease and possibly other otherwise solid materials that are not pulled into the suction inlet to be discharged. It has become an unpleasant experience to find out that certain of these gasses that are not sucked into the exhaust system and which rise upwardly with the heated air from the burners to hit the ceiling above the stove, are condensed upon and thus deposited on the ceiling above the stove and to some extent on the wall area adjacent the vicinity of the stove, and over a period of time unless such deposits are promptly removed, such deposits cause a perceptible build up of an objectionable layer of a sticky mass to form. Such a layer usually includes a variety of solids including a greasy substance that is not only unsightly but also may ultimately be absorbed into the surface upon which it has been deposited to become a health and also a fire hazard.

While it is known to provide hoods over stoves generally that are connected to exhaust means to remove vapors and objectionable fumes from flowing upwardly from the cooking surfaces of stoves, either for esthetic reasons are otherwise, the providers of the modern counter top type of stoves have not seen fit to provide for the use of such a hood and, in all the conventional designs for counter top stoves, the practice has been to rely upon the use of the down-draft counter top suction inlet mounted in the same horizontal plane as the plane in which the heating elements are mounted, which suction means is designed to be powerful enough to effectively remove all of the unwanted vapors from the several usual domestic or other types of counter-top of cooking operations. As pointed out above, however, for certain cooking procedures such as broiling and grilling for example the suction removal system has not always been found to be completely satisfactory for effecting the removal of all of the gasses, smoke particles, spatter and vapors flowing from the food being cooked.

Prior Art

The following U.S. patent illustrate the state of the art:

| | |
|---|---|
| 587,766 to Singewald | Aug. 10, 1897 |
| 1,650,859 to Anderson | Nov. 29, 1927 |
| 2,095,745 to Hiatt | Oct. 12, 1937 |
| 2,248,216 to Bukoski | July 8 1941 |
| 2,623,516 to Salem | 1952 |
| 2,744,519 to Means | May 8 1956 |
| 4,019,497 to Koons | April 26, 1977 |
| 4,436,323 to Takahashi | March 13, 1984 |

Singewald shows the use of a removable hood like means that may be fitted over one opening in a wood or coal burning stove to extend rearwardly to cover a second opening to the fire box. The natural draft produced by the chimney in the fire box is then effective to produce a draft of air that flows from the ambient air surrounding the stove to flow into the inlet to the hood and through the hood and into the fire box in order to remove smoke and the like flowing upwardly from the food being cooked into the fire box and then into the chimney connected to the fire box. In this disclosure, the hood is a narrow structure fitted to closely surround the pan of food placed over the opening to the fire box in this old fashioned style of stove. The hood of this invention will pick up all the smoke that might escape from the opening to the fire box as well as any gases arising from the food in the pan on the stove. It is to be noted that the close fitting of this hood to the opening to the fire box and the food on top of the stove causes the in flow of air from the atmosphere to come into close contact with the food being cooked and will produce a noticeable cooling effect on the exposed surface of the food to slow the cooking process.

Hiatt shows a removable, non-vented or entirely closed hood type of a cover for the top side of an outdoor or portable cooking stove. The hood is closed on its top as well as all of its four sides except for the doors in the front wall which may be opened from time to time. Salem shows a generally similar removable, non-vented spatter shield.

The Anderson and Takahashi patents show more or less conventional permanently mounted hood devices supported over their respective stoves to collect all of the particles and gasses flowing upwardly from all of the cooking facilities toward the ceiling and deliver the collected gasses to suction exhaust means.

Other protective means are known for enclosing material being cook when the cooking process may cause a spatter or other debris to fly from the a pan on a conventional stove, for example see the patents to Bukoski, Means and Koons. These disclosures do not include a showing of the use of any form of suction exhaust means adapted to be used in association with the guard means there shown.

BRIEF DESCRIPTION OF THIS INVENTION

The removable hood device here shown is designed to be used especially for covering food placed upon the broiler or grill means for a counter top stove that has a down-draft suction opening in the counter adjacent the burner means. The hood is manually placed in position over the food being broiled or grilled and is constructed of a length to cover all of the burner means in that cooking zone and extend beyond that zone somewhat. It has a width to cover that zone and also extend from the burner zone to Cover the inlet to the suction exhaust means. The dimensions of the hood are such that when the hood is positioned over the burners and the suction means is activated, a positive but gentle draft of air is pulled through the hood from the ambient air surrounding the hood, into the hood to provide a positive but gentle flow of air over the burners and into the suction means. Since the hood is open on both ends, the down-draft exhaust means Can continue to service the entire stove top and its coaction with the grilling or broiling portion of the stove does not interfere with the cooking and venting functioning of the remaining burners on the counter top.

An additional feature of this hood is the inclusion of a radiant heat reflecting surface above the burner zone and within the hood. This surface is positioned to collect any radiant heat rays escaping upwardly from the cooking zone to redirect these rays onto the food being cooked.

THE DRAWINGS

FIG. 1 is a perspective view showing the removable hood of this invention in position on a counter top type of stove; and FIG. 2 is a sectional view taken on the plane 2—2 of FIG. 1.

DETAILED DESCRIPTION

Figure 1:
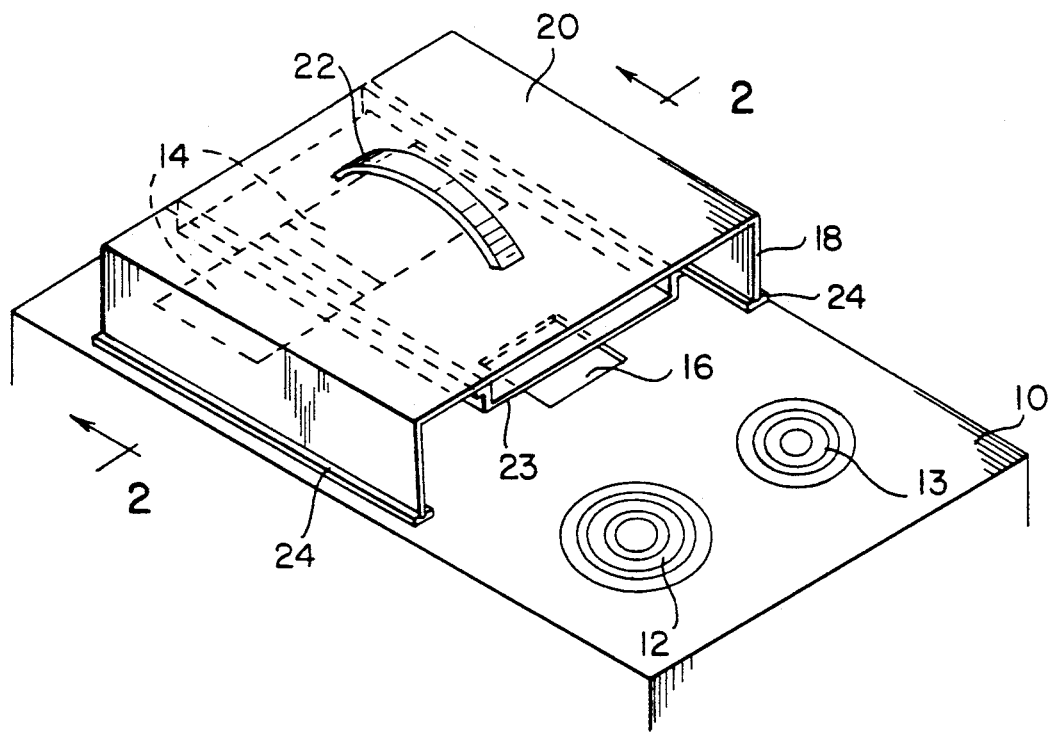

The prefered counter top stove for which this hood is adapted to be used, is shown in FIG. 1. The top 10 of the stove is mounted in the counter top of a kitchen in a home, or other location, one such known stove being sold under the trademark "Jen-Air". This stove and others like it may be provided with the conventional round electrical resistor or gas fired units 12 and in the broiler or grill portion of the stove, square burner units 14 are mounted. Positioned about centrally of the four burner units there is an inlet 16 to a suction conduit means (not shown) that is intended to be operative to produce a down draft having a sufficient motion to carry off all the particles and exhaust gasses that arise from the cooking operations performed on the counter top, when vegetables or other food is cooked on top of the stove the hot air flowing from the burner units is deflected generally in a horizontal direction by the cooking utensils placed over the heating units and the suction means draws the moving air into the suction inlet together with most of the steam arising from the cooking process.

Figure 2:
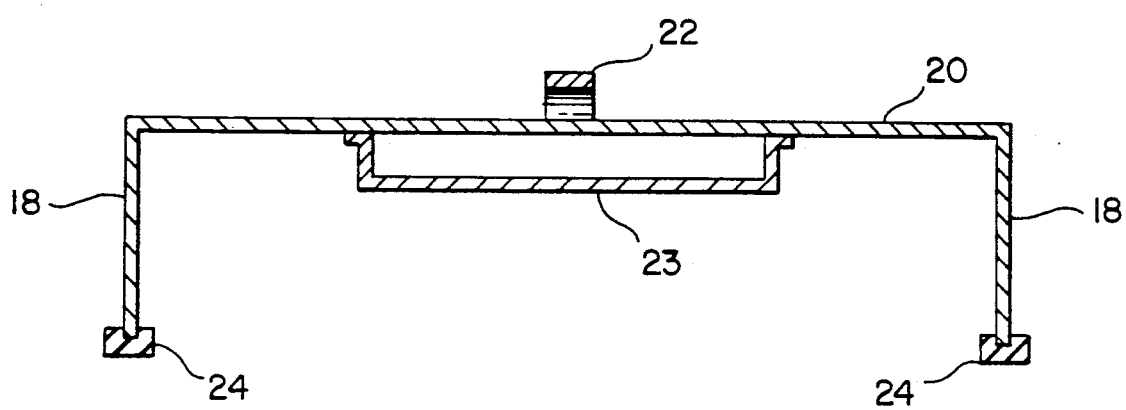

When a steak or some other food is placed directly on grills fitted closely over the burner units 14 however, it has been found that while some of the smoke, vaporized gases and hot air produced during the broiling or grilling operation are collected into the inlet of the suction means, that some of the hot air flowing upwardly from the burner units 14 together with some of the vaporized grease and smoke particles escape from the suction draft and flow upwardly to the ceiling of the kitchen. It has been found that after some short period of using the counter top type of stove for broiler and grilling activities, that this upwardly flow of gases from these activities causes a sticky deposit of condensed grease and smoke particles to form above the burners and to some extent on the walls surrounding the stove area, that is not only unsightly, but is also difficult to remove. It has also been noted that also when broiling or grilling operations are performed on the conventional "Jen Air" stove and similar structures, that solid particles are deposited on the adjacent counter surface when a spattering action is produced during the cooking process. To avoid the deposition of such materials on the ceiling over the broiler station and spattered particles on the counters, the portable hood shown in FIG. 2 has been found to be most effective. When this hood which is preferably made of a light gauge sheet of stainless steel is placed over the burners of the broiler or grilling means, the hot gasses and particles released during the cooking process are contained and are substantially all forced to flow into the suction inlet. The hood of this invention has two vertical side walls formed integral with the top 20. A suitable handle 22 may be provided and the bottom edges of the walls may be covered with any suitable bearing material 24 adapted to withstand an exposure to the high temperatures of the burner means that is provided to preclude the possible scratching of the counter top when the hood is placed over the burner elements during the broiling or grilling operation.

The under side of the top 20 is provided with a heat insulating means 23 that protects the handle 22 from becoming too hot for comfort. This element preferably takes the form of a sheet of stainless steel spaced slightly under the under surface of top 20 to provide an air circulating channel under the handle area of the top and the sheet 24 is dimensioned to cover the area over both of the burner means 14 so that the under surface of the plate may be finished with a heat reflective surface in order to capture any radiant heat energy escaping upwardly from the burner means to turn that heat back on the food being cooked on the grill.

It is to be noted that the hood has a length from one end wall 18 to the other to extend over both of the broiler units 14 and to extend a little distance beyond and has a width to cover all of the area above both of the broiler units as well as that over the inlet to the suction duct. The end walls have a vertical length to space the top a short distance above the product on the broiler. The stainless steel or other material from which the heat shield under the top of the hood may be constructed as above described is provided on its under side surface with a polished or other form of surface that reflects the radiant heat that may escape upwardly from around the steak or other food on the grill, the reflected heat being returned downwardly onto the top side of the product being broiled to aid in the cooking process.

In use, the hood of this disclosure is adapted to be placed over a pair of the burners on a counter top type of domestic or similar stove, preferably over the broiler or grill section of the stove, when a steak for example is being broiled and in this position the hood is operative to cause a gentle air flow to take place, that moves air from the ambient air outside of the hood, over the product on the broiler or grill to flow under the reflective surface of the surface of the heat insulator 24. The space provided between the reflective surface and the food on the grill provides in effect, an air duct that conveys the air sucked into the open end of the hood along with any smoke particles, vaporized grease, steam and any material that flows upwardly from the broiler that becomes entrained in the air flow, which air duct is effective to direct the combined air mixture directly into the inlet to the suction means. The relatively large crossectional area of this air duct means causes the air flow to move at a relatively slow velocity over the food being cooked to minimize the cooling effect that might otherwise be produced by an air flow moving over the food being cooked and yet the air flow is continuous from the outside of the hood, over the food and into the suction inlet so that all of the vapors, particles etc. that would otherwise flow up to the ceiling with the hot air flow from the burners, are now carried directly into the down-draft suction duct to be disposed of.

The hood structure of this invention is operative to contain all of the smoke, odors, particles and vaporized grease and steam etc. that would otherwise be allowed to flow upwardly to impinge upon and be condensed upon the cooler ceiling and possibly the surrounding wall areas over and near the stoves that are not similarly protected. These objectionable particulate vaporized materials that are all contained within the hood of this invention, are delivered by the gentle air flow that is produced by the suction means directly into the inlet to the exhaust means.

The hood is also provided with an inner heat reflective surface as above described, that turns the heat that would otherwise be lost back onto the food being broiled which action together with the gentle flow of air over the food that removes the combustion products, renders the cooking process most efficient while at the same time provides complete protection for the ceiling area and other areas above the broiler from the deposition of the condensed vapors from a broiling or grilling operation or any other cooking process where an up flow of the cooking gasses might be found to be objectionable.

While the above description covers the preferred form of my invention, it is possible that modifications thereof may occur to those skilled in the art that will fall within the scope of the following claims.

I claim:

1. A removable ventilating hood for a counter top stove that is defined by an area having two sides and a front and back side, said stove having a plurality of pairs of front and back burner means adapted to cooperate with a downdraft suction means, said suction means having an inlet opening generally centered between the burner means, each one of the burners of said pair of burner means having a shape to and being dimensioned to cooperate with a conventional sized cooking vessel, said hood comprising a shell having a top and legs forming a generally U shaped crossection that is adapted to be placed in an inverted position on said countertop, the legs of the U shape forming the front side and back side walls of the shell, said front side and said back side walls being connected by said top to complete said inverted U shaped shell element, said shell having a length from said front side wall to said back side wall to extend a distance that is longer than the longest dimension from the front of said stove to its back of any one of said front and back pair of burner means, and said shell having a width extending from one of said sides to cover said pair of burner means and the inlet opening to said down draft suction means when said front and back side walls are positioned in front of one of the front burners and behind its cooperating rear burner of that pair of front and back burners respectively whereby when said shell is so positioned over at least one of said pair of burner means and said inlet opening, said suction means is operative to produce a gentle flow of air within the confines of the shell over any product positioned over any of said burner means in order to entrain any gaseous products rising from such product in said flow of air that is directed by said hood to flow directly to the inlet of said suction means.

2. A removable ventilating hood as in claim 1 wherein said legs of said shell have a vertical length that is sufficient to elevate said top of said shell above said burner means a distance to produce said gentle flow of air within said confines of the shell.

* * * * *